United States Patent
Gerard

[15] 3,685,874
[45] Aug. 22, 1972

[54] METHOD OF CENTERING A SHAFT IN A BEARING AND HYDROSTATIC BEARING WITH HIGH RIGIDITY FOR CARRYING OUT THIS METHOD

[72] Inventor: Paul Gerard, Versailles, France

[73] Assignee: Agence Nationale de Valorisation de La Recherche Tour Aurore, Paris, France

[22] Filed: Oct. 6, 1970

[21] Appl. No.: 78,436

[30] Foreign Application Priority Data

Oct. 10, 1969 France......................6934668
Sept. 10, 1969 France..................7034585

[52] U.S. Cl....................................................308/9
[51] Int. Cl..............................................F16c 17/16
[58] Field of Search...............................308/9, 122

[56] References Cited

UNITED STATES PATENTS 2,976,087  3/1961  Cherubin........................308/9
3,110,527  11/1963  Fox.............................308/122

Primary Examiner—Martin P. Schwadron
Assistant Examiner—Frank Susko
Attorney—Jacobi, Davidson, Lilling & Siegel

[57] ABSTRACT

In a hydrostatic bearing of the kind having at least three radially opposed chambers for receiving fluid under pressure, the invention provides a distributor in the form of a floating ring disposed around the shaft but rotationally fixed, ways through which fluid is selectively fed to the chambers, the inlets to the ways being controlled by the position of the ring, cavities with walls afforded by the ring and from which fluid passes to the inlets of the ways, and calibrated passages leading from the source of fluid under pressure to the respective cavities. In use when the shaft moves laterally towards any chamber the flow through that chamber is reduced and the pressure increased so that the pressure drop through the associated calibrated passage is correspondingly reduced. This leads to pressure differences between the cavities and consequent movement of the ring so as to impede the reduction of fluid supply to any chambers in which the pressure increases.

22 Claims, 19 Drawing Figures

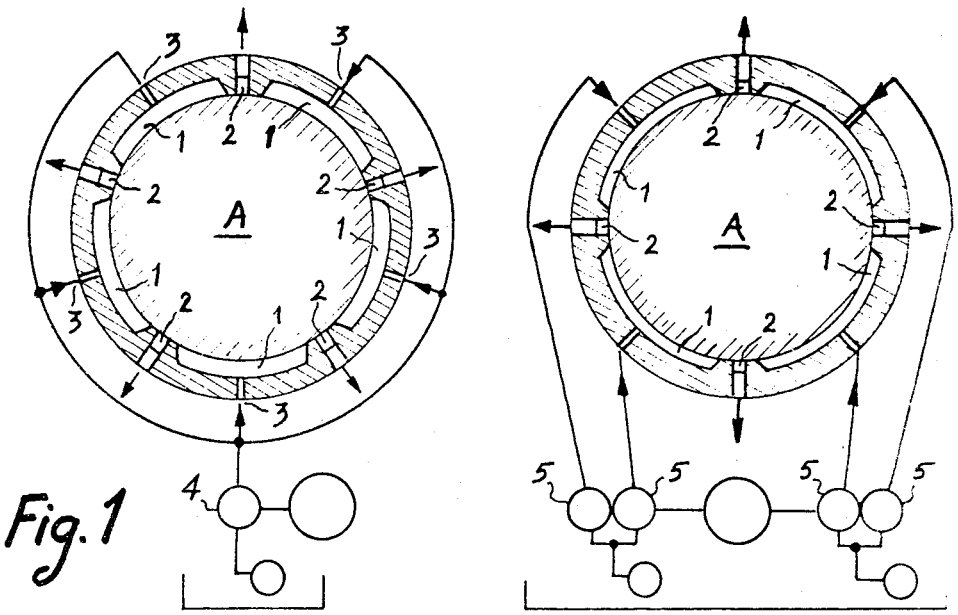
Fig. 1
Fig. 2
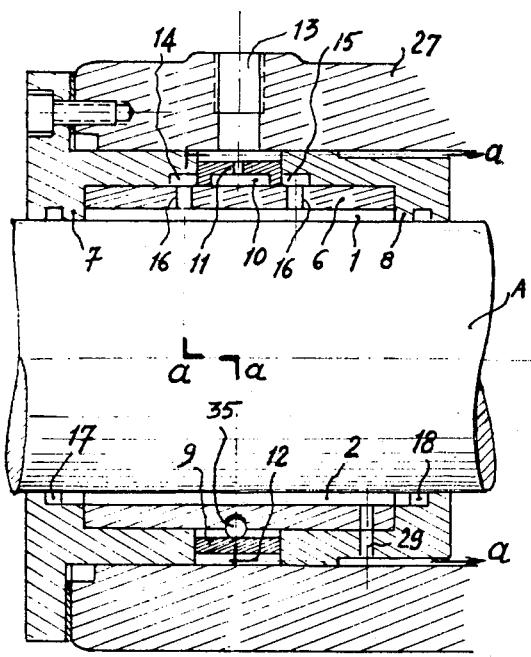
Fig. 3
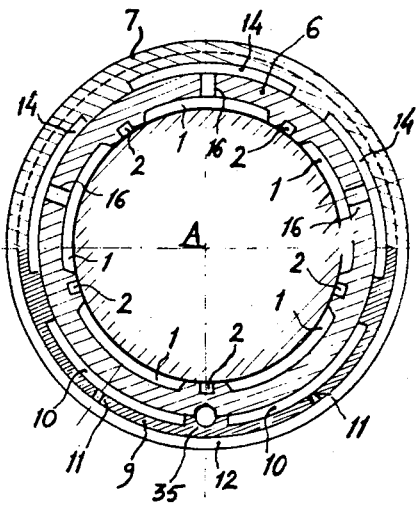
Fig. 4

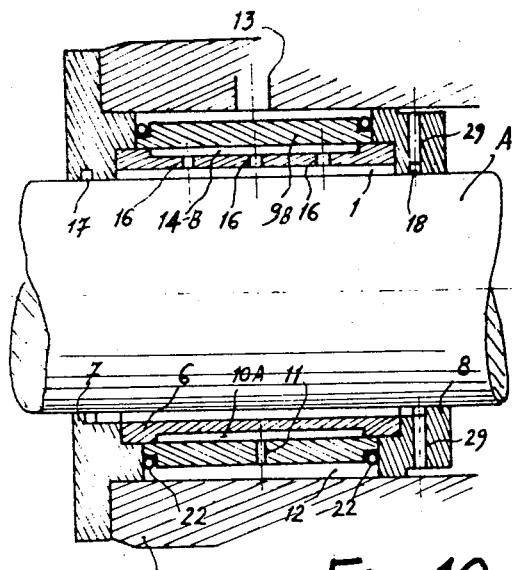
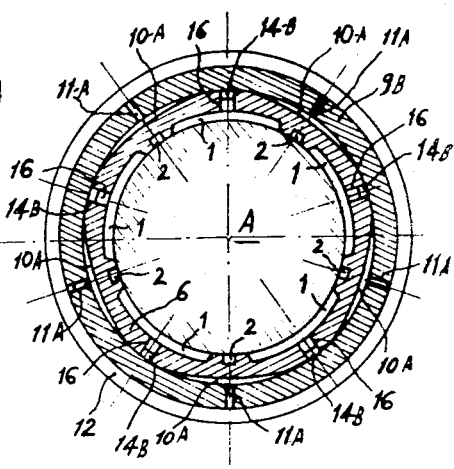
Fig. 10          Fig. 9
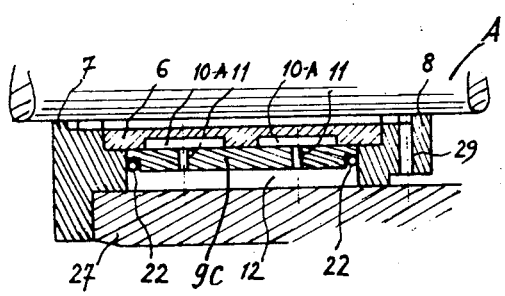
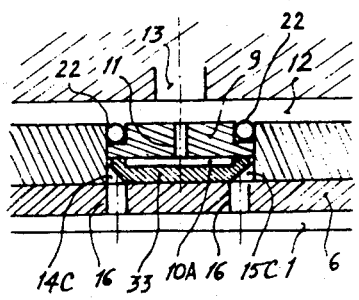
Fig. 11          Fig. 12

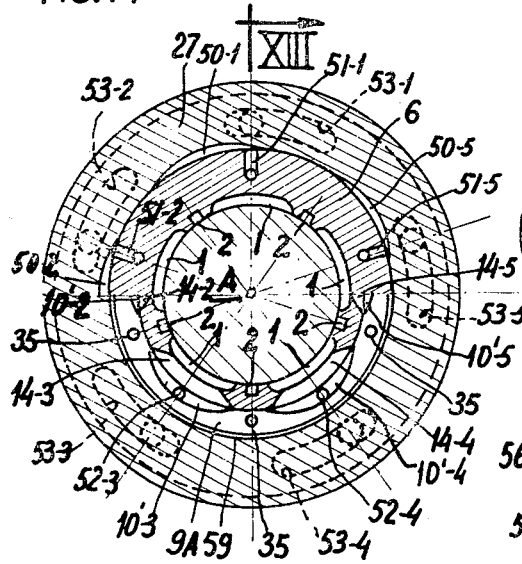
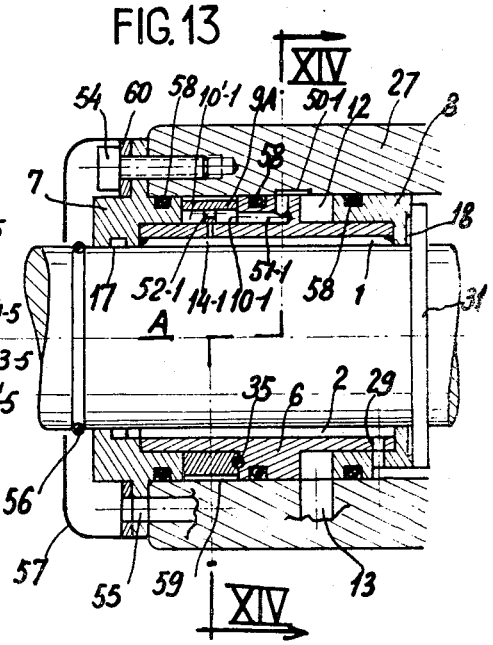
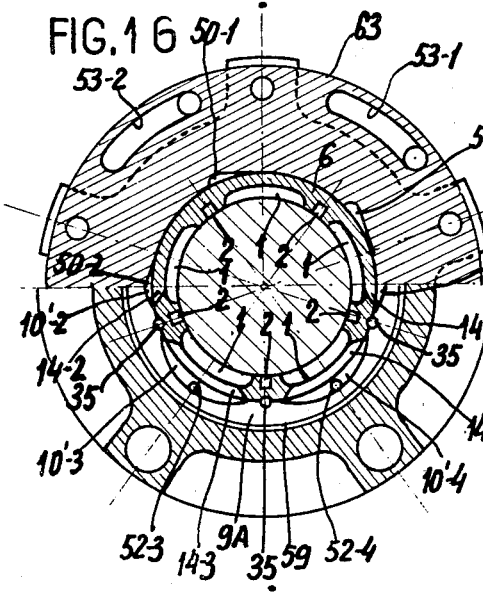
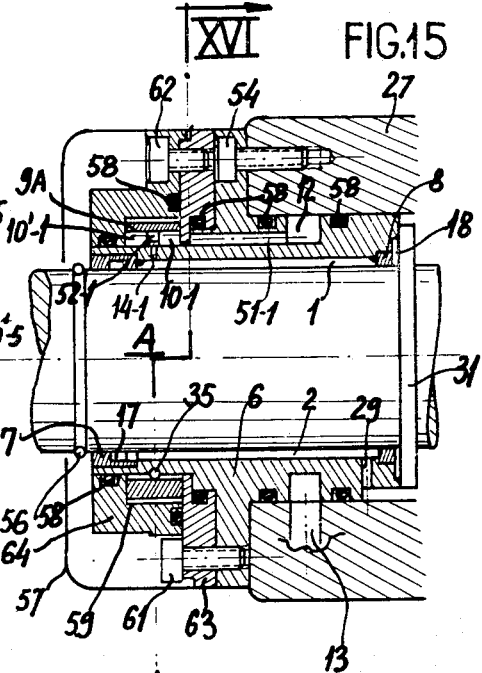

3,685,874

METHOD OF CENTERING A SHAFT IN A BEARING AND HYDROSTATIC BEARING WITH HIGH RIGIDITY FOR CARRYING OUT THIS METHOD

This invention relates to bearings in which the shaft is surrounded and supported by currents of fluid under pressure. More particularly it relates to such hydrostatic bearings in which the centering of the shaft is automatically ensured.

Such bearings are already in current use and have been described, in particular in French Pat. Nos. 994,356 and 998,513.

Classic "fluid" bearings have the disadvantage of limited capacity and rigidity.

To avoid this difficulty various solutions have already been proposed:

Thus, in classic "self-centering" bearings such as those described in French Pat. No. 1,040,241, the position of the shaft is measured by hydraulic pick-ups constituted by auxiliary chambers the pressure of which serves to direct the distribution devices which control the feed for the main chambers.

Other palliatives are described in French Pat. Application No. PV.169,744 filed 14th October, 1968 for: "Hydrostatic cradle bearing", now French Pat. No. 1,594,660. However, bearings made in this way are complicated, cumbrous and expensive. Consequently they are of practical use only in installations requiring bearings of large size and able to include only a small number of chambers.

The invention has as its aim a method and a bearing not having the above-mentioned disadvantages of the classic bearings.

The invention has as its object a method for automatically centering a shaft in a hydrostatic bearing with at least three opposed radial chambers fed with fluid under pressure balancing the radial forces of said shaft, characterized in that all the chambers are fed directly from a single external source of fluid under pressure, that said fluid is distributed between said chambers with a single distributor incorporated in said bearing and that one impedes the reduction of the supply of said feed fluid to any of said chambers when the pressure increases in said chamber.

According to an advantageous variant of this method, the supply of fluid is made to vary selectively in each of the chambers as a direct function of the variation of pressure in said chambers in response to the radial forces of the shaft.

The invention also has as its object a hydrostatic bearing with high rigidity characterized in that it comprises at least one ring floating in the interior of an annular housing surrounding the shaft supported by said bearing and into which issues at least one supply of fluid under pressure and selective ways for leading said fluid towards the opposed radial chambers of said bearing, said ring selectively controlling, by its displacements, the passage of said fluid through said ways, one of the faces of said angularly fixed ring constituting at least one movable wall with several cavities each communicating through said ways with at least one of the opposed radial chambers of said bearing, each of said cavities communicating, through a calibrated passage, with the source of fluid under pressure.

In a simple embodiment, the aforementioned calibrated passages extend through the floating ring itself. However, this arrangement has the disadvantage of requiring the presence of seals against the ring, with a view to avoiding parasitic currents; and these seals can create friction prejudicial to the proper functioning of the device.

This is why, in another embodiment, the calibrated passages in question are disposed between the inlet of the fluid under pressure and the annular housing containing the floating ring.

Further, in certain embodiments, the floating ring is mounted in a manner permitting displacement in radial directions, but then it is necessary to provide between said ring and its seat a working clearance allowing the pressure, in the opposed radial chambers of the bearing, to oscillate around the value most favorable to the proper functioning of the whole, this value being generally considered as ideal when it is in the neighborhood of half the supply pressure. But, the adjustment of this clearance is a constructional constraint which is not negligible; further, this clearance departs from its ideal value if the bearing is used for carrying a shaft of which the clearance in the bearing has undergone a modification.

To remedy this difficulty, in other embodiments of the invention, the entrance faces of all the ways are situated in a common plane perpendicular to the axis of the bearing facing a single front face of the floating ring resiliently urged against said plane and mounted in a manner enabling very small rocking movements to occur in the course of which its axis makes a very small angle relative to the axis of the bearing, to ensure the above-mentioned control of the passage of the fluid through the ways.

Thanks to this particular arrangement, one has no longer to concern oneself with the determination and maintainance of the value of a working clearance at a very precise value.

The invention will be better understood by reading the detailed description which follows and by examination of the accompanying drawings which represent, by way of non-limitative examples, several embodiments of the invention.

In these drawings:

FIG. 1 is a schematic cross-section of a simple classic bearing in which each chamber is fed through a nozzle;

FIG. 2 is a schematic section through another, improved, classic bearing, in which each chamber is fed by an independent volumetric pump;

FIG. 3 is a longitudinal section through a bearing according to the invention;

FIG. 4 is a transverse section of the bearing of FIG. 3 along the broken line $a$—$a$;

FIG. 6 to 12 shows variations of the bearing according to the invention, particularly as concerns the arrangement of the floating ring and of the ways with which it co-operates;

FIG. 13 is a section along the line XIII—XIII of FIG. 14 of a hydrostatic bearing with a floating ring with radial displacements without seals;

FIG. 14 is a section along the broken line XIV—XIV of FIG. 13 (the floating ring being shown not sectioned);

FIG. 15 is a section along the line XV—XV of FIG. 16 of a bearing similar to that of FIGS. 13 and 14, but designed to facilitate access to and control of the floating ring;

FIG. 16 is a section along the broken line XVI—XVI of FIG. 15 (the floating ring being shown not sectioned)

Figure 5:
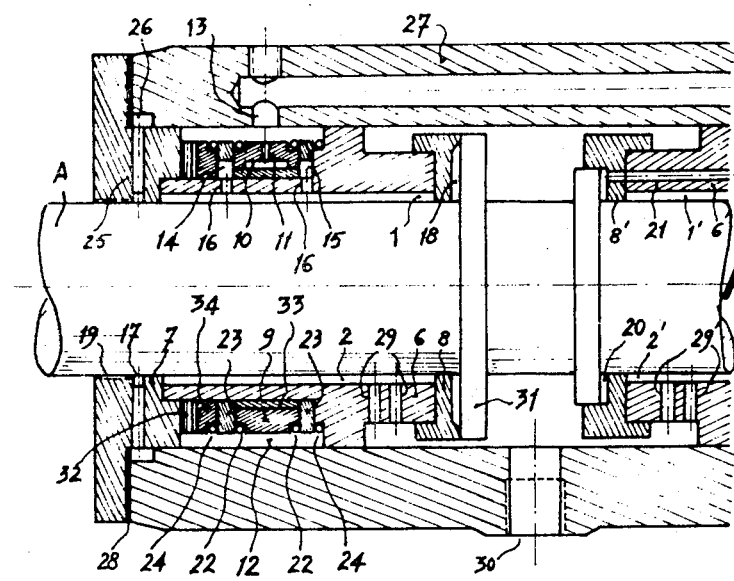
FIG. 5 is a longitudinal section through a bearing according to the invention, incorporating a certain number of improvements, and in particular axial abutments.

The classic hydrostatic bearing shown in FIG. 1 comprises a series of chambers 1 separated by evacuation grooves 2 and fed by nozzles 3 from a source 4 of fluid under pressure.

Such a bearing has the following disadvantage: if the shaft A carried in the bearing tends to descend, for example under the effect of gravity, the pressure in the chamber at the bottom increases because the cross-section of the escape path between the shaft and the bearing decreases. Because of this the discharge from this chamber decreases since the feed nozzle then works with a reduced pressure difference.

For such a bearing to function better it would be necessary for the discharge from this chamber to increase to maintain the constant clearance as the pressure in the chamber increased.

But the hydrostatic bearing of FIG. 1 works exactly to the contrary; and this is why its carrying power and rigidity are limited.

It has also been proposed to feed each chamber 1 by a separate volumetric pump 5 as shown in FIG. 2, or by a single pump of which the output is divided by an output dividing device to send the same output to the different chambers.

The bearing according to the invention, shown in FIGS. 3 and 4, comprises pressure chambers 1, and evacuation grooves 2; it was clearly constituted by three principal elements: a central sleeve 6 closed at its left-hand end by a ring with flange 7 and at its right-hand end by a ring without a flange 8. The assembly 6, 7, 8 is formed into one piece after being put together. It can be secured by force, welded, keyed, etc. . . . in a casing 27.

The floating ring 9, characteristic of the present invention, is mounted with a radial clearance on the sleeve 6 and with a lateral clearance between the rings 7 and 8.

In the bore of the floating ring 9 are formed cavities 10 less large than the ring. In the ring 9 there are as many cavities 10 as there are chambers 1 in the sleeve 6 and the orientation of chambers 1 and cavities 10 is maintained in angular coincidence by an arrangement, such as a key with clearance or a ball inserted both into a slot in the ring 9 and a recess in the sleeve 6 as represented at 35 in FIGS. 3 and 4. Each cavity 10 is fed by a nozzle 11 opening into the recess in the sleeve 9 forming an annular groove 12 serving for the feed of the bearing by way of a canal 13 leading from a source of fluid under pressure (not shown).

In the ring 7 are formed ways 14, and in the ring 8 ways 15. The ways 14 and 15, like the cavities 10, are angularly orientated like the chambers 1 and communicate with them through canals 16.

The equilibrium conditions of the ring 9 are such that axially it is constantly in equilibrium as to each way 14 there corresponds a way 15 of the same size, which is opposite to it and which is under the same pressure, while radially over its outer surface the floating ring 9 is bathed in the fluid under pressure which feeds the bearing, and it is thus in equilibrium. On the other hand, on its inner surface the ring 9 is subjected to pressures prevailing in the different cavities 10.

These last pressures remain constantly equal between themselves. In fact, if initially the shaft contained in the bearing is not subjected to any exterior force and if all the elements of the bearing and the shaft are rigorously concentric, the fluid under pressure follows the path: canal 13, circular groove 12, nozzles 11, cavities 10, ways 14 and 15, canals 16, chambers 1, longitudinal evacuation grooves 2 and annular evacuation grooves 17 and 18 in the rings 7 and 8, and evacuation canals 29.

Because of the symmetry, the flows and the pressures are the same in all the chambers 1.

If now the shaft tends to rise vertically, the flow through the top chamber 1 tends to diminish as its discharge diminishes. Because of this fact, the pressure difference in the top nozzle 11 reduces, so that the pressure in the top cavity 10 increases. The ring 9 tends to rise, more especially as simultaneously and by the converse effect, the pressure in the bottom cavities 10 is reduced. The ring 9 then takes up a new equilibrium position, eccentric in an upward direction by an amount necessary to re-establish pressure equilibrium between the different cavities 10.

The ring 9 cannot move eccentrically too high, because the pressures in the lower cavities 10 would become greater than those in the top cavities, and would give birth to a resultant pressure returning the ring 9 downwards.

In the same way, a displacement of the shaft downwards would provoke a downward eccentric movement of the floating ring 9. Finally, the ring 9 takes up at any moment a degree of eccentricity the value and orientation of which correspond to the value and orientation of the radial forces transmitted by the shaft in the bearing, and this ring 9 remains constantly in equilibrium as the cavities 10 all have the same pressure.

Thus it is unnecessary to provide sealing arrangements between the cavities 10.

If the width of the interior ribs of the ring 9 is small, that is to say if the cavities 10 occupy almost the whole volume of this ring, the operation is exactly that described above; the pressure being the same in all the cavities 10, all the nozzles 11 work under the same pressure differential, and in consequence all the chambers 1 receive the same flow, whatever their pressures. Thus the first aim of the invention is achieved.

But if desired one can increase the width of the inner ribs of the ring 9 by forming the cavities 10 distinctly less wide than this ring.

The pressure prevailing under these ribs can be considered as being the mean between the pressure in the cavities 10 and the pressure in the chambers 1.

In consequence, with sufficiently large ribs, the floating ring 9 becomes responsive to the pressure prevailing in the chambers 1.

If, as above, the shaft tends to rise vertically, the flow through the top chamber 1 tends to diminish as its discharge diminishes. Because of this the pressure differential across the nozzle 11 at the top diminishes, so that the pressure in the cavity 10 at the top increases. The ring 9 tends to rise, more especially as simultaneously by the converse effect of pressure in cavities 10 at the bottom diminishes.

Here there returns the effect described above. But to this effect is added another. In the case of a vertical rise of the shaft, the pressure in chamber 1 at the top increases. And as with the wider ribs the ring 9 becomes responsive to the pressure in the chambers 1, it is subjected to a rising hydraulic pressure. Because of this fact, it only remains in equilibrium if the pressure in the top cavity 10 diminishes. But then the top nozzle 11 works at a greater pressure differential and thus yields more. Thus the chambers 1 of which the pressure increases under the effect of the radial force transmitted by the shaft should receive a flow greater than the others; thus is attained the second aim of the invention which comes back to maintaining substantially constant the clearance between the shaft and the bearing, whatever may be the variations in radial forces transmitted by the shaft to the bearing. A bearing possessing this quality is sometimes called a "self-centering bearing" and it is said that its rigidity is infinite.

FIG. 5 shows a hydrostatic bearing identical in principal to that of FIGS. 3 and 4. The parts which correspond have the same references.

In the bearing of FIG. 5, the evacuation grooves 2 do not issue into the circular evacuation grooves 17 and 18 as in the bearing of FIGS. 3 and 4. The end ring 7, beyond the groove 17, carries a thread 19 of which the sense is calculated so as to tend to oppose leakage from the groove 17 on rotation of the shaft.

The groove 18 in the end ring 8 constitutes a sort of shallow chamber, of ring-shape, fed with the leaks from the chambers 1 as far as the left-hand bearing is concerned.

As far as the right-hand bearing is concerned, the chamber 20 in the ring 8' has a surface substantially half of that of chamber 18, and it is fed by one (or more) canals 21 leading from the circular groove (not shown), similar to the groove 12 serving for feeding the right-hand bearing under pressure.

The floating ring 9 is provided with two seals 22 preventing direct flow between the groove 12 and the ways 14 and 15 which, by by-passing the nozzles 11 would disturb the proper functioning of the apparatus.

The ways 14 and 15, instead of being milled in the end rings 7 and 8 respectively, are broached in the rings 23.

The circular groove 17 issues through canals 25 into another annular groove 26 formed in the casing 27 where the bearings are housed. The groove 26 communicates with evacuation canals (not shown) in the casing 27. A seal 20 gripped between the flange of the ring 7 and the casing 27 prevents leaks.

The canals 29 ensure the communication of the grooves 2 with the interior of the casing whence the fluid returns to the reservoir through an orifice 30.

The sealing of one part to another of the rings 23 is effected by seals 24 preferably identical with the seals 22.

A ring 33 serves as a distance-piece between the two rings 23. Its width is slightly greater than that of the floating ring 9 so that the latter is free between the rings 23.

The ring 23 at the left bears on a rotary ring 34 ensuring the closure of the corresponding ways 14.

Lastly a resilient ring 32, for example of the corrugated kind, maintains parts 34–23–33–23 in compression against the shoulder of the sleeve 6.

The operation of the bearing of FIG. 5 in response to radial movements of the shaft is in all points identical to that of the bearing of FIGS. 3 and 4.

As far as the balancing of axial movements is concerned, chambers 18 and 20 function in the following manner: chamber 20 being directly fed under the pressure feed of the bearings creates a constant pressure towards the left, but this pressure is balanced by the pressure prevailing in chamber 18. The collar 31 remains automatically placed at a certain clearance from the corresponding end ring 8. In Fact, if the collar 31 were in direct contact with the ring 8, the pressure in the chamber 18 would tend to separate the collar 31 from the ring 8. Conversely, if the collar 31 is separated too far from the ring 8, the pressure in the chamber 18 falls towards zero; the pressure present in chamber 20 becoming preponderant would return the collar close to the ring 8.

In the preceding example, the chamber 20 is fed through a canal 21 but in a simplified construction, one can disperse with canal 21; chamber 20 is then fed from the leaks from chambers 1' of the corresponding bearing.

In all of the foregoing, the ring 9 and the two rings 23 have to remain orientated in coincidence with chambers 1 by means of some type of key not shown.

The clearance between the floating ring and its housing is proportionately of the same order of size as the clearance between the shaft and the ends of the walls of the pressure chambers. In practice these clearances are of the order of a tenth of a millimeter and, for reasons of simplicity, they are not shown in the drawings.

Figure 6:
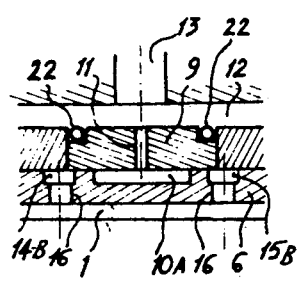
Figure 7:
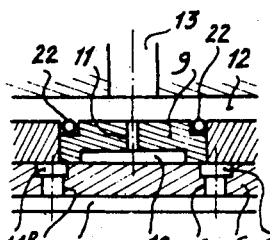

The invention is amenable to numerous variations. Thus, as shown in FIG. 6, cavities 10A, instead of being formed in the ring 9, can be formed in the outer surface of the sleeve 6. Similarly, the ways 14B and 15B can be formed in this same outer surface, or equally well (FIG. 7) the cavities 10 can remain in the ring 9 and the ways 14B and 15B pass through the outer surface of the sleeve 6.

Figure 8:
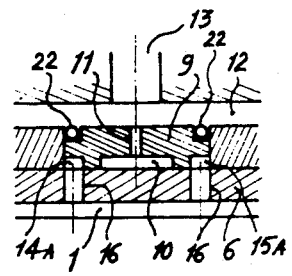

Certain advantages are thus obtained in the operation if the ribs of the ring 9 are wide enough for this ring to be responsive to the pressure prevailing in the different chambers 1. This responsiveness can be further increased by forming in the ring 9 both the cavities 10 and the ways 14A and 15A as is shown in FIG. 8.

Another variation is shown in FIGS. 9 and 10. Here the floating ring 9B is elongated to the point where it becomes a sleeve. The cavities 10A are formed like the ways 14B in the outer surface of the sleeve 6. Thus in this construction there exists an annular off-set between cavities 10A acting on the ring and the chambers 1 of the bearing.

To give greater stability to the sleeve 9C, one can also longitudinally divide into two the cavities 10A and their feed nozzles 11 as is shown in FIG. 11.

One can also make the system capable of disassembly by fitting the sleeve 6 by means of a screw-thread to at least one of the two rings 7 or 8.

One could also give the bore of the ring 9 and the corresponding surface of the bearing a slightly conical shape to enable the corresponding clearance to be easily regulated by adjusting the axial position of the ring 9.

FIG. 12 shows another variation in which the ways 14C and 15C ensuring the feed of the chambers 1 of the bearing take the form of chamfers formed on the inner surface and at the ends of the spacer 33.

In the interior of the casing 27 of the hydrostatic bearing of FIGS. 13 and 14 are formed five cavities 50-1 to 50-5 of crescent-shaped form which communicate both with the feed groove 12 and with five right-angled canals 51-1 to 51-5. The floating ring 9 has two series of five chambers 10-1 to 10-5 and 10'-1 to 10'-5, each chamber such as 10-1 being connected to the chamber such as 10'-1 which is associated with it by a canal such as 52-1 ensuring the equilibrium of the pressures in these two chambers. The central sleeve 6 of the bearing has ways 14-1 to 14-5 formed with a milling-cutter which issue directly into the pressure chambers 1 of the bearings. The left-hand ring 7 (in FIG. 13) of the bearing has openings in the form of eyes 53-1 to 53-5 (FIG. 14) enabling the bearing to be fixed in the casing 27 in the desired angular position. The fixing in question is effected by screws 54 bearing on a pierced plate 60. The ring 7 and the plate 60 are traversed at the bottom by a canal 55 for collecting any leaks.

The shaft A carries a deflector 56 which rotates with it, and which can be limited to a torroidal seal fixed into a groove formed in the shaft. A sealing cap 57 serves to retrieve leaks. Lastly three sealing rings 58, torroidal for example, ensure the necessary static sealing.

The operation of the bearing of FIG. 13 and 14 is as follows: the feed fluid arrives through canal 13 into the annular groove 12, crosses the five crescents 50-1 to 50-5, the five right-angled canals 51-1 to 51-5, and arrives in chambers 10-1 to 10-5 and also 10'-1 to 10'-5 thanks to the equalizing canals 52-1 to 52-5. Each pair of chambers such as 10-1, 10'-1 feeds one way such as 14-1 which issues into the corresponding chamber 1.

By suitably adjusting, thanks to eyes 53-1 to 53-5, the angular position of the bearing relative to the casing 27, one simultaneously adjusts the five restrictions formed between the crescents such as 50-1 and the entrance of the canals such as 51-1, restrictions which play the same role as the nozzles 11 in the embodiments of FIGS. 1 to 12.

Thus the floating ring 9 is only in radial equilibrium if the pressure is substantially the same in all of the chambers such as 10-1 and 10'-1.

The five restrictions to the entrance of the canals such as 51-1 thus all work substantially at the same pressure drop, and in consequence discharge the same outflow into the five pressure chambers 1 of the bearing.

The floating ring 9 is in axial equilibrium as, on the one hand its shape is symmetrical relative to a median plane, and on the other hand each right-hand chamber in FIG. 13 such as 10-1 is in equilibrium through a canal 52-1 with the corresponding left-hand chamber 10'-1.

As in the arrangement of FIGS. 1 to 12 sealing is unnecessary between the different chambers such as 10-1 and between the different chambers such as 10'-1, as the pressure which prevails in them is practically the same.

But, in the blind annular space 59 between the ring 9 and the casing 27, there occurs a pressure which is substantially the means of the pressures in the different chambers such as 10-1 and 10-1. Sealing is thus unnecessary between the annular space 59 on the one hand and the chambers such as 10-1 and 10'-1 on the other hand.

Finally the ring 9 is free from any seal, and free from any friction.

In its fundamentals the arrangement of FIGS. 15 and 16 differs only slightly from that of FIG. 13 and 14. It is simply made in a manner to facilitate removal of the floating ring 9A. The bearing is fixed by screws 54 trapping a flange integral with the central sleeve 6 against the casing 27, this time without the possibility of angular movement. An intermediate plate 63 is gripped by screws 61 against this flange. The plate 63 has eyes such as 53-1, 53-2, etc. ... permitting its angular adjustment so that the cavities 50-1 to 50-5 which it has can uncover to a greater or lesser extent the feed canals such as 51-1.

A cover 64 is gripped at its margin against the plate 63 by means of screws 62 and leaves an annular space 59 in which the floating ring 9A is housed.

Thanks to this particular arrangement access can be had to the ring 9A while leaving the bearing fixed in the casing 27, and entirely avoiding alteration of the adjustments of the feeds 51-1 to 51-5.

Figure 19:
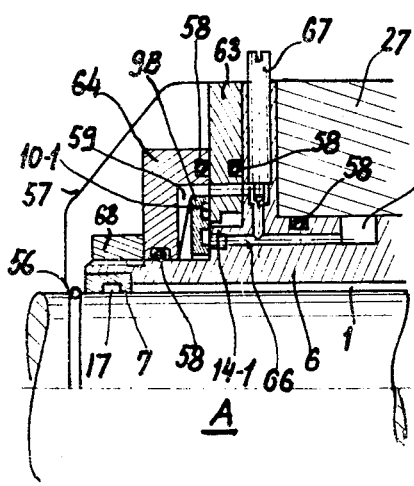
FIG. 19 is a half-section along the line XIX—XIX of FIG. 18.
Figure 17:
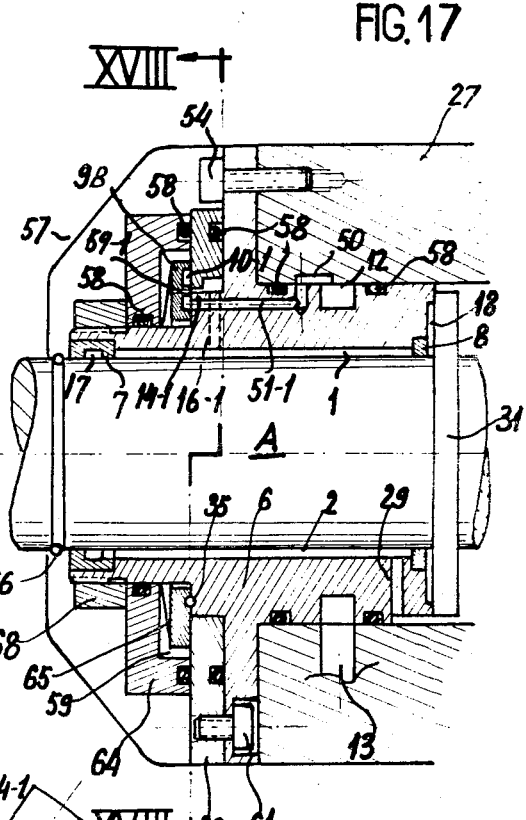
FIG. 17 is a section along the line XVII—XVII of FIG. 18 of a hydrostatic bearing with a floating ring having tilting displacements.
Figure 18:
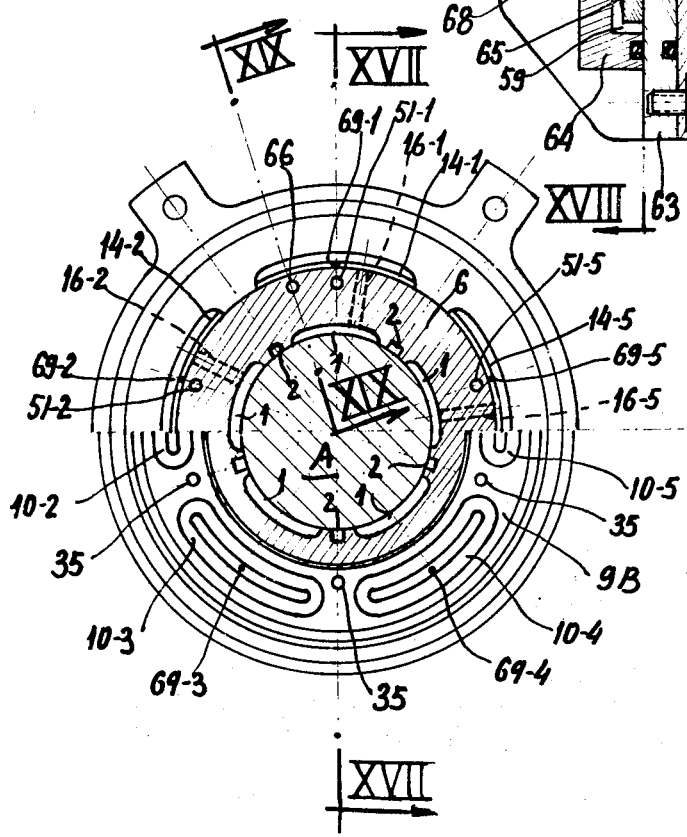
FIG. 18 is a section along the broken line XVIII—XVIII of FIG. 17.

FIGS 17, 18 and 19 show a bearing with a floating ring, mounted in such a manner as to be able to undertake very small rocking movements around a notional point situated substantially on the axis of the bearing, and of which the axial position automatically adjusts itself to ensure ideal working conditions, that is to say that its axis can make an angle of variable size and orientation relative to the axis of the bearing. The flange integral with the sleeve 6 (FIG. 17) has eyes which permit, as in the arrangement of FIG. 13, the adjustment of the orientation of the bearing in the casing 27 to enable the feed of the canals such as 51-1 to be controlled at will. On this flange is fixed an intermediate plate 63 with the aid of screws 61. This plate is hollowed with ways 14-1 to 14-5 equal in number to that of the chambers and communicating with them through canals 16-1 to 16-5. The floating ring 9B is flat in the neighborhood of the plate 63. It has five closed chambers 10-1 to 10-5 (FIG. 18) so as to be responsive to the pressure prevailing in the conduits such as 51-1 and plays the role of closure in relation to ways 14-1 to 14-5. A star-shaped spring 65 tends to urge the floating ring 9B against the plate 63. A supplementary canal 66 (FIG. 19) of which the interior is controlled by a needle 67 allows feeding of the annular space 69 existing between the ring 9B and the cover 64. A screw secures the cover 64.

The ring 9B is pierced with five nozzles 69-1 to 69-5 issuing into the ways 14-1 to 14-5. Thus the pressure in the space 59 is a function rising, not only with the feed pressure of the bearing, but also with the pressure prevailing in the chambers 1.

The operation of the bearing of FIGS. 17 to 19 is as follows:

The needle 67 controls a substantially constant reference pressure in the annular space 59, this pressure being intermediate between the feed pressure and the pressure in the chambers 1. The ring 9B automatically places itself in the desired axial position as it is substantially in equilibrium between the reference pressure in the annular space 59 and the pressure in the chambers 10–1 to 10–5.

In fact, if the ring 9B is too far to the left (in FIG. 17), the ways such as 14–1 would be largely uncovered, so that the pressure in the chambers such as 10–1 would be substantially that of the chambers 1, and thus inferior to the reference pressure in the annular space 59. The ring 9B would then be urged towards the right by a hydraulic pressure.

Conversely, if the ring 9B were too far to the right, for example abutting against the plate 63, the ways such as 14–1 would be completely closed so that the pressure in the chambers such as 10–1 would be practically the feed pressure, and thus superior to the reference pressure in the annular space 59. The ring 9B would then be urged towards the left by a hydraulic pressure.

The mathematical analysis of the flow shows that, finally, the needle 67 thus allows substantial regulation of the mean of the pressures ruling in the chambers 1 to any value, and which remains a given fraction of the pressure ruling in the canals such as 51–1, and in consequence to any value, and which remains a given fraction of the feed pressure.

The bearing will function then with pressures, in the chambers 1, oscillating about a mean equal, for example, to half the feed pressure, this definitely representing the ideal for obtaining the best rigidity with this type of apparatus.

It will be noted that these ideal conditions are safeguarded even if the clearance varies between the bearing and the shaft A which it supports, either due to thermal expansions, or because the shaft has been replaced by another of slightly different diameter, or for any other reason.

There will now be explained how the arrangement of FIGS. 17 to 19 reacts to a radial displacement of he shaft A.

It will be supposed for example that the shaft tends to rise.

The evacuation of the top chamber 1 tends to diminish so that its outflow equally tends to be reduced. The pressure drop at the entrance of the top canal 51–1 tend to diminish, and the pressure in the top chamber 10–1 then tends to increase. Simultaneously, and by the converse effect, the pressure in the lower chambers 10–3 and 10–4 tends to diminish. The ring 9B then starts a rocking movement in an anti-clockwise sense (considered as viewed in FIG. 17), which has the effect of increasing the feed of the top chambers 1 which the shaft tends to approach, and of throttling the feed of the lower chambers 2 which the shaft tends to move away from.

Finally the ring 9B automatically takes up a position of tilt such that the pressure is substantially the same in all of the chambers such as 10–1; consequently the five restrictions at the entrance of the canals such as 51–1, working under the same feed, yield the same output to the five chambers 1.

It will be noted that the ring 9B can be made more responsive to the pressure prevailing in the chambers 1 if the size of the ways such as 14–1 are suitably increased. Consequently, the apparatus no longer discharges a constant flow in all of the chambers but discharges a greater flow into the fuller chambers and a lesser flow into the less full chambers; this thus increases the rigidity of the bearing.

In FIGS. 1 to 12 were illustrated arrangements with a ring floating with a radial movement, the active surface of which was cylindrical having as its axis the axis of the bearing.

With reference to FIGS. 17 to 19 is described an arrangement with a floating ring with a rocking movement of which the active surface is a plane perpendicular to the axis of the bearing.

It is thus clear that the invention also includes any other different geometrical arrangement but having the same function. For example an intermediate configuration between the cylinder and the plane would be a conical configuration (not shown) of the floating ring which would ensure the same advantages as the arrangement of FIGS. 17 to 19. In other words if the floating ring were conical, it would ensure, by its axial position, a mean value of the pressures in the chamber 1 equal to a given fraction of the feed pressure, and, by its radial and rocking positions, an equal division of flow between the chambers 1.

One can also create the reference pressure in the annular space 59 differently. One can, for example, omit the nozzles such as 69–1 and provide a nozzle between the annular space 59 and one or more evacuation grooves 2. One could thus adjust to a given value the reference pressure, then the mean pressure in the chambers such as 10–1, then the mean rate of flow at the entrance of the canals such as 51–1, then the mean flow into he chambers 1, and finally their mean pressure.

Of course the invention is not limited to the embodiments described and shown; one could add many modifications, depending on the applications in mind, without departing from the scope of the invention.

What we claim is:

1. A method of automatically centering a shaft in a hydrostatic bearing with at least three radially opposed chambers fed with fluid under pressure balancing the radial forces of said shaft, characterized in that all of the chambers are fed directly from a single external source of fluid under pressure, that said fluid is distributed between said chambers with a single distributor incorporated in said bearing, and that one impedes the reduction of the supply of said feed fluid to any of said chambers when the pressure increases in said chamber.

2. A method according to claim 1, characterized in that the supply of fluid to each of the chambers is varied selectively as a direct function of the variations of pressure in said chambers in response to radial forces of the shaft.

3. A hydrostatic bearing of high rigidity for carrying out the method according to claim 1, characterized in that it comprises at least one ring floating but angularly fixed in the interior of an annular housing surrounding the shaft supported by said bearing, into which housing there issues at least one supply of fluid under pressure, and ways selectively supplying said fluid to the radially opposed chambers of said bearing, said ring selectively controlling, by its displacement, the flow of said fluid through said ways, one of the faces of said ring constituting at least one movable wall with several cavities in communication, through said ways, each with at least one of the radially opposed chambers of said bearing each of said cavities communicating through a restriction with the supply of fluid under pressure.

4. A bearing according to claim 3, characterized in that the floating ring has parallel end faces and is mounted so as to be radially movable in all directions between two complementary parallel end faces of the bearing.

5. A bearing according to claim 3, characterized in that the restrictions comprise calibrated passages extending through the floating ring.

6. A bearing according to claim 4 characterized in that the ways are formed in a member fast with the bearing and situated opposite the planar end faces of said ring, said ways communicating through canals with the opposed radial chambers.

7. A bearing according to claim 4, characterized in that the ways are formed in the floating ring.

8. A bearing according to claim 4, characterized in that the ways are formed in the exterior surface of a fixed member fast with the bearing.

9. A bearing according to claim 3 characterized in that the cavities are hollowed in the floating ring.

10. A bearing according to claim 3 characterized in that the cavities are hollowed in the exterior surface of a fixed member fast with the bearing.

11. A bearing according to claim 5 characterized in that the floating ring forms an elongated sleeve one face of which co-operates with several cavities each fed through a fixed nozzle, the ways being formed by longitudinal grooves disposed between said cavities.

12. A bearing according to claim 11 characterized in that the sleeve co-operates axially with two series of cavities each of said cavities being angularly separated from its neighbor by a way.

13. A bearing according to claim 4 characterized in that the floating ring carries sealing members avoiding parasitic flows of fluid in parallel with those which pass through the restrictions.

14. A bearing according to claim 13 characterized in that at least one wall of the cavities is constituted by a surface of a fixed annular spacer co-axial with said bearing and situated opposite the floating ring.

15. A bearing according to claim 14 characterized in that the ways and the cavities are hollowed in the spacer.

16. A bearing according to claim 3 characterized in that it also includes means for balancing the shaft axially.

17. A bearing according to claim 3 characterized in that the aforementioned restrictors are disposed between the supply of fluid under pressure and the annular housing containing the floating ring.

18. A bearing according to claim 17 characterized in that each restrictor is formed between the sides of two orifices respectively belonging to two members co-axial with the shaft and angularly offset one relatively to the other.

19. A bearing according to claim 3 characterized in that the face of the floating ring opposite that face thereof forming a movable wall of the cavity is connected to the supply of fluid through an adjustable nozzle.

20. A bearing according to claim 17 characterized in that the entry faces of all the ways are situated in the same plane perpendicular to the axis of the bearing, facing a single front face of the floating ring resiliently urged against said plane and mounted in a manner so as to be able to effect very small rocking movements in the course of which its axis makes a very small angle relative to the axis of the bearing, to ensure the aforementioned control of the flow of fluid through the ways.

21. A bearing according to claim 20 characterized in that the cavities are hollowed into the said front face of the floating ring.

22. In a fluid pressure bearing for a journal, comprising a body, a cylindrical bearing member for said journal mounted in said body, said bearing member having openings and collector grooves positioned to provide a plurality of circumferentially spaced pressure zones about said journal, and duct means in said body for conducting fluid under pressure from an outside source through said openings to said pressure zones to hold said journal in a normal running position, said duct means including an annular space surrounding said bearing member and individual channels for establishing a communication between said annular space and each of said openings, the improvement comprising an annular flow rate control member disposed in said annular space and surrounding said bearing member with a clearance space therebetween so as to be bodily movable within said space relative to a median position in which said annular member being responsive, on the one hand, to the pressure fluid entering said annular space so as to move to said median position and, on the other hand, to any decrease in the rate of fluid flow through a given pressure zone so as to move from said median position in a direction and over a distance such as to cause a corresponding increase in the rate of fluid flow through said given pressure zone and a corresponding decrease in the rate of fluid flow through pressure zones opposing said given pressure zone.

* * * * *